Aug. 1, 1967  L. G. BOEHNER  3,333,865
WHEEL SUSPENSION SYSTEM FOR A MOTOR VEHICLE
Filed June 10, 1965

LUDWIG G. BOEHNER
INVENTOR

BY John R. Faulkner
Clifford L. Sadler

ATTORNEYS

United States Patent Office 3,333,865
Patented Aug. 1, 1967

3,333,865
WHEEL SUSPENSION SYSTEM FOR A
MOTOR VEHICLE
Ludwig Georg Boehner, Cologne-Mungersdorn, Germany, assignor to Ford Motor Company, Dearborn, Mich., a corporation of Delaware
Filed June 10, 1965, Ser. No. 462,949
2 Claims. (Cl. 280—124)

The present invention relates to motor vehicle wheel suspension systems, and more particularly to a suspension system for rear vehicle wheels.

The present invention has particular application to the undriven rear wheels of a vehicle, for an example, in a vehicle having front wheel drive.

It is the principal object of this invention to provide an independent rear suspension system for a motor vehicle in which the suspension system is formed as a complete subassembly for attachment as a unit to the vehicle chassis.

It is also an object of the present invention to provide a vehicle wheel suspension in which a complete subassembly is constructed for the mounting of the rear wheels, and in which the chassis is supported on the wheels by torsion springs.

It is a further object to provide a torsion bar suspension system in which rotatably mounted tubes enclose the torsion bar and provide a pivot support for the suspension arm.

The many objects and advantages of the present invention will become apparent upon consideration of the following discussion and the accompanying drawings in which.

Figure 1:
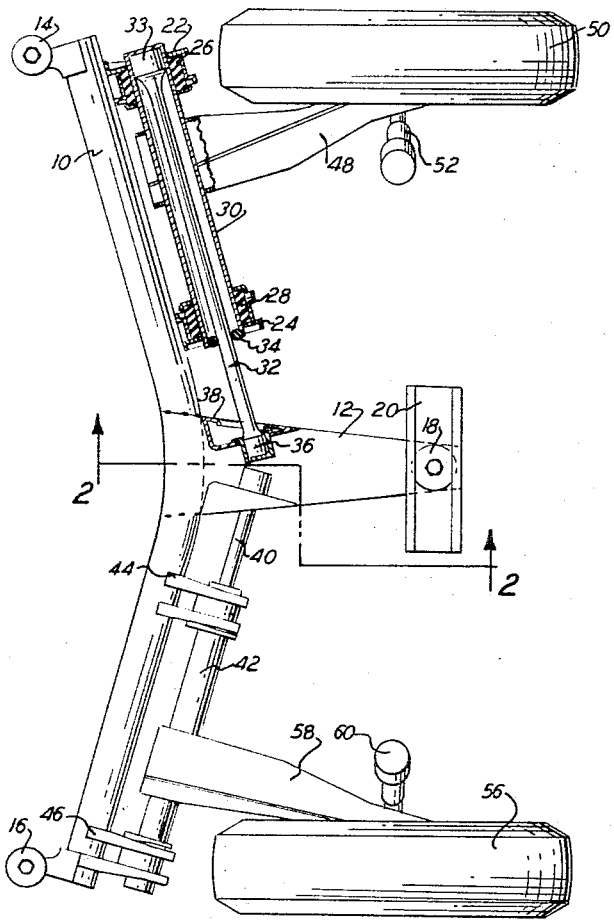
FIGURE 1 is a top plan view, partly in section, of an independent rear suspension system for a motor vehicle incorporating the present invention.
Figure 3:
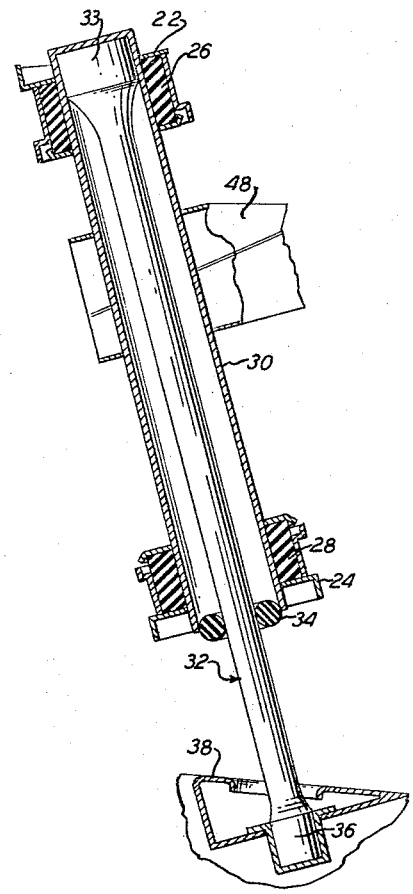
FIGURE 3 is an enlarged view in section of the torsion bar mounting portion of the suspension of FIGURE 1.

Referring now to the drawings for a more comprehensive understanding of the invention, FIGURE 1 discloses an independent rear suspension system for a motor vehicle having a subframe assembly which comprises a transverse member 10 of circular cross section. The member 10 has a generally wide angled V construction with the apex at the rearmost point. A longitudinal member 12 is welded to the midpoint of the transverse member 10 and extends rearwardly therefrom.

A bracket and resilient mount 14 is provided at the right-hand end of the tubular subframe member 10. Similarly, a resilient mount bracket 16 is connected to the left-hand end of the tube 10. A resilient mount 18 is secured to the rearmost end of the longitudinal subframe portion 12. Transverse member 10 and longitudinal member 12 constitute the subframe assembly upon which the wheel suspension system is secured. This subframe assembly is connected to the chassis of a vehicle by the resilient mounts 14, 16 and 18. The vehicle chassis may comprise a transverse frame member 20 which is illustrated as being connected to the resilient mount 18.

A bracket 22 is welded to the left outer end of the tubular frame member 10 and extends rearwardly therefrom. A second bracket 24 is welded to the tube 10 and spaced inwardly from the first bracket 22. The brackets 22 and 24 contain resilient bushings 26 and 28 which rotatably support a tubular member 30. A torsion bar 32 is fitted within the tube 30 and has its axis lying generally parallel to the adjacent portion of the tubular frame portion 10.

The outer end 33 of the torsion bar 32 is secured to the outer end of the tube 30. The end of the tube 30 is enclosed at its outer end to prevent the entry of contaminants within the tube. The inner end of the tube 30 is sealed by a resilient O-ring or seal 34 which surrounds the torsion bar 32 and through which the torsion bar 32 extends. The innermost end 36 of the torsion bar 32 is secured to a bracket 38 that is welded to the longitudinal frame member 12.

The foregoing paragraphs describe the mounting of the torsion bar 32 at the right-hand portion of the subframe assembly 10. In a similar fashion, a left-hand torsion bar 40 is situated within a tube 42 that is secured to the left-hand end of the subframe member 10 by brackets 44 and 46. The inner end of the torsion bar 40 is connected to the longitudinal frame member 12.

Figure 2:
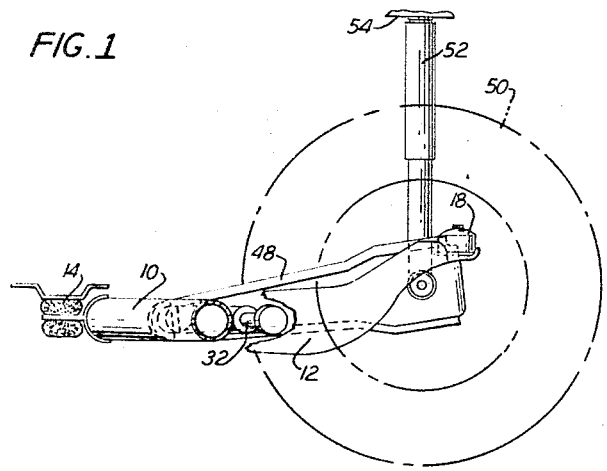
FIGURE 2 is a side elevational view, partly in section, taken along section lines 2—2 of FIGURE 1.

A longitudinally extending suspension arm 48 is secured at its inner end to the tube 30. Because the tube 30 is rotatably mounted by the bushings 26 and 28, the arm 48 is free to swing about the axis of the tube 30. The rearmost end of the suspension arm 40 is connected to the wheel bearing housing (not shown) for the road wheel 50. A telescopic shock absorber 52 is connected at its lower end to the end of the suspension arm 48 and at its upper end it is constructed to be connected to a chassis member such as the portion 54 shown in FIGURE 2.

Similarly, the left-hand road wheel 56 is rotatably mounted at the rear end of the left suspension arm 58. The forward end of the arm 58 is connected fast with the tube 42. Thus, the wheel 56 is mounted to swing in conjunction with the arm 58 about the axis of the tube 42. A telescopic hydraulic shock absorber 60 is connected to the rear end of the arm 58 and has its upper end connected to the chassis in order to hydraulically dampen the jounce and rebound movement of the wheel 56.

In operation, when the arm 48 moves upwardly in jounce the tube 30 will rotate about its axis due to its mounting in the bushings 26 and 28. The outer end 33 of the torsion bar 32 is connected to the tube 30 so that when the arm 48 rotates, a twist will be imparted to the torsion bar 32. Due to the fact that the inner end 36 of the torsion bar 32 is anchored, the bar will resiliently resist the jounce movement of the arm 48 and wheel 50.

An embodiment of the present invention provides several distinct advantages for the rear suspension system of a motor vehicle. Such a suspension is integrated into a complete subassembly for securing as a unit to a vehicle chassis. The suspension is of simplified arrangement and, therefore, inexpensive to construct and service. The torsion bars are enclosed for the major portion of their length which protects them. The pivot support for the arms 48 and 58 are wide spaced which contributes to their stability.

The foregoing description presents the presently preferred embodiment of this invention. Modifications and alterations may occur to those skilled in the art that will come within the scope and spirit of the following claims.

I claim:
1. A suspension system for a motor vehicle comprising a subframe structure constructed to be resiliently connected as a unit to the chassis of a vehicle, said subframe structure comprising a transverse member having a resilient chassis mount at each of its outer ends, a longitudinal member connected to the midpoint of said transverse member and extending rearwardly therefrom, a resilient chassis mount connected to the rear end of said longitudinal member, a pair of spaced apart brackets connected to one of the ends of said transverse member, a tubular mem- ber rotatably and resiliently connected to said pair of brackets, a torsion bar disposed within said tubular member and having one end connected to the outer end of said tubular member and having its other end extending inwardly from the inner end of said tubular member, said other end of said torsion bar being connected to said longitudinal frame member, a longitudinally extending suspension arm having its forward end secured to said tubular member, a road wheel rotatably mounted at the rear end of said suspension arm.

2. A suspension system according to claim 1 and including:

said suspension arm being connected to said tubular member between said pair of brackets, means mounting said wheel on said suspension arm and constructed for rotation about an axis that is fixed with respect to said suspension arm.

References Cited
UNITED STATES PATENTS 2,702,701 2/1955 Thorne _____ 267—57
3,085,817 4/1963 Krause.
3,158,365 11/1964 Peras.

FOREIGN PATENTS 1,250,215 11/1960 France.

BENJAMIN HERSH, *Primary Examiner.*

P. GOODMAN, *Assistant Examiner.*